United States Patent
Kawakita

[11] Patent Number: 6,055,384
[45] Date of Patent: *Apr. 25, 2000

[54] APPARATUS FOR APPLYING SUCCESSIVELY DIFFERENT FORCES TO A FILM CARTRIDGE DURING INSERTION AND USE THEREOF

[75] Inventor: Katsuya Kawakita, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/880,183

[22] Filed: Jun. 20, 1997

Related U.S. Application Data

[63] Continuation of application No. 08/440,906, May 15, 1995, abandoned.

[30]     Foreign Application Priority Data

May 26, 1994  [JP]  Japan ................................. 6-134905

[51] Int. Cl.[7] .................................................. G03B 17/24
[52] U.S. Cl. ............................................................ 396/538
[58] Field of Search ..................... 396/439, 535, 396/538; 360/85, 96.5

[56]           References Cited

U.S. PATENT DOCUMENTS

| 4,866,551 | 9/1989 | Kishimoto et al. ..................... 360/96.5 |
| 4,913,368 | 4/1990 | Atkinson . |
| 4,930,720 | 6/1990 | Hwang ................................... 242/198 |
| 5,049,914 | 9/1991 | Dassero .................................. 354/288 |
| 5,159,365 | 10/1992 | Takahashi et al. ....................... 396/285 |
| 5,184,264 | 2/1993 | Choi ........................................ 360/105 |
| 5,258,793 | 11/1993 | Tsuji et al. .............................. 354/288 |
| 5,539,484 | 7/1996 | Wakabayashi ....................... 396/538 X |

OTHER PUBLICATIONS

International Publication No. WO 90/00759, published Jan. 25, 1990.

*Primary Examiner*—David M. Gray
*Attorney, Agent, or Firm*—Robin, Blecker & Daley

[57]           ABSTRACT

An apparatus adapted for an image recording medium cartridge having an operation part for operating a cover to open and close an opening part for passing an image recording medium includes a first part for causing the operation part of the cartridge to act and a second part for applying a first force to the cartridge so as to cause the first part to engage the operation part and for subsequently applying a second force smaller than the first force to the cartridge so as to hold the cartridge.

30 Claims, 14 Drawing Sheets

APPARATUS FOR APPLYING SUCCESSIVELY DIFFERENT FORCES TO A FILM CARTRIDGE DURING INSERTION AND USE THEREOF

This is a continuation application under 37 CFR 1.62 of prior application Ser. No. 08/440,906 filed on May 15, 1995 (aban.).

BACKGROUND OF THE INVENTION

1. Field of the Invention

This invention relates to an improvement on an apparatus such as a camera adapted to use a film cartridge which is provided with a movable light shield cover.

2. Description of the Related Art

The conventional cartridge loading device of a camera of the kind adapted to use a film cartridge having a movable light shield cover for opening and closing a film inlet/outlet opening has included a support member which is arranged on a cartridge chamber lid to support the film cartridge, as disclosed in Japanese Patent Application No. HEI 5-342050. The support member is urged by a spring to push the film cartridge into a cartridge chamber (for loading) when the cartridge chamber lid is closed.

The conventional device which is arranged as shown by way of example in FIG. 14, however, necessitates exertion of a large force in inserting the film cartridge 201, because an engaging part 201a of the film cartridge 201 must be caused to engage a light shield cover driving member (not shown) for opening and closing the movable light shield cover (not shown) of the film cartridge 201. Therefore, in order to have the film cartridge set in a correct position, a strong spring is used for urging the support member. As a result, the strong spring force is applied also to a fork 202, as shown in FIG. 14. The strong spring force then eventually comes to generate a frictional force on a base plate 204 by which a fork gear 203 is supported.

Assuming that the spring force is expressed as P, the radius of contact as R and the coefficient of friction as $\mu$, the frictional torque Tf of the above-stated friction can be expressed as follows:

$$Tf = \mu \cdot P \cdot R$$

Since the spring force P must be 700 gf or thereabout, the frictional torque Tf becomes about 50 gcm, which becomes a load in transporting a film. The load not only retards the film transport speed but also causes an increase in the electric energy consumption.

SUMMARY OF THE INVENTION

One aspect of this invention lies in that, in accordance with this invention, an apparatus such as a camera adapted for an image recording medium cartridge having an operation part for operating a cover to open and close an opening part for passing an image recording medium is provided with first means for causing the operation part of the cartridge to act and second means for applying a first force to the cartridge so as to cause the first means to engage the operation part and for applying a second force which is smaller than the first force to the cartridge so as to hold the cartridge. The arrangement according to this invention is such that the first means is reliably caused to engage the cartridge and yet no inconvenience is caused by the cartridge holding force.

The above and other aspects and features of this invention will become apparent from the following detailed description of preferred embodiments thereof taken in connection with the accompanying drawings.

DETAILED DESCRIPTION OF THE PREFERRED EMBODIMENTS

Some of preferred embodiments of this invention are described below with reference to the drawings.

Figure 1:
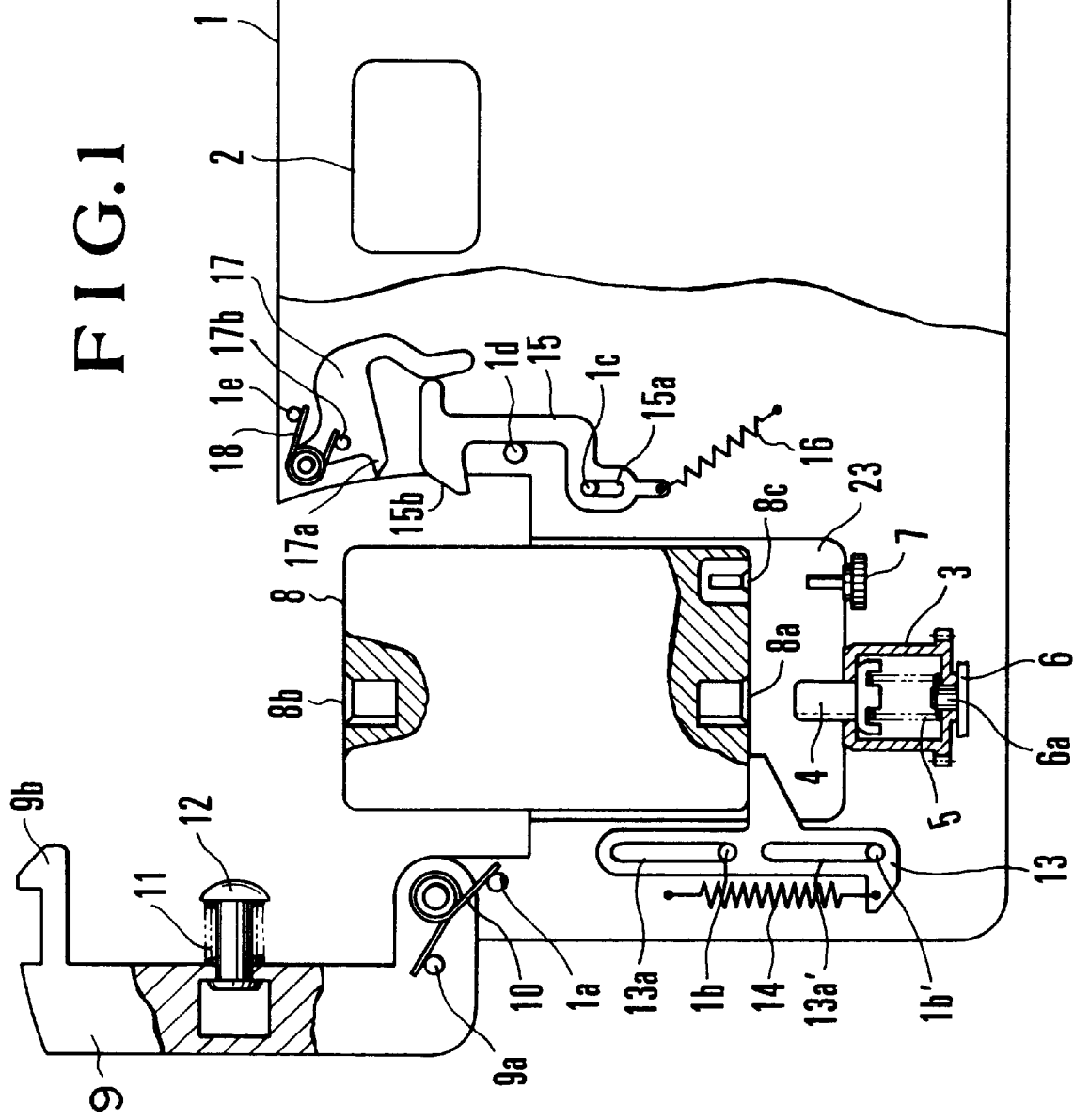
FIG. 1 is a partly cutaway rear view showing a camera which is arranged as a first embodiment of this invention in process of having a film cartridge set in a cartridge chamber.

FIGS. 1 to 5 relate to a camera arranged as a first embodiment of this invention. FIG. 1 shows in a partly cutaway rear view the camera in process of setting a film cartridge in a cartridge chamber.

Referring to FIG. 1, the illustration includes a camera body 1, a viewfinder 2 and a fork gear 3. The fork gear 3 is arranged to be caused to rotate forward or backward with the output of a motor which is not shown transmitted in a speed-reduced state. A fork 4 is arranged to impart a rotatory driving force to a spool shaft disposed within a cartridge for moving a film. The fork 4 rotates together with the fork gear 3 and is slidable up and down relative to the fork gear 3. A fork spring 5 is arranged to urge the fork 4 to slide upward. A base plate 6 is arranged to support the fork gear 3 and is provided with a fork shaft 6a, which fits into the fork gear 3. A light shield cover driving member 7 is arranged to engage an engaging part of a film cartridge 8 and to open and close a movable light shield cover which is provided for opening and closing a film outlet/inlet opening of the film cartridge 8. The film cartridge 8 which contains a film therein is provided with a fork engaging part 8a, a support member abutting part 8b which is arranged to have a film cartridge support member 12 come to abut thereon, and a light shield cover opening/closing engaging part 8c which is arranged to permit opening and closing actions to be performed on the movable light shield cover from outside.

A cartridge chamber lid 9 is pivotally supported by the camera body 1 to be swingable on a shaft. An opening spring 10 is hooked on spring pegs 9a and 1a and is arranged to constantly urge the cartridge chamber lid 9 to move in the direction of opening. Further, a lock claw 9b is formed integrally with the cartridge chamber lid 9. The support member 12 which is arranged to support the film cartridge 8 by axially pushing the spool shaft of the film cartridge 8 is slidably supported by the cartridge chamber lid 9 in a state of being urged by a pushing-in spring 11. An ejector 13 which is provided for pushing out the film cartridge 8 is arranged to be slidable up and down, as viewed on the drawing, jointly by guide slots 13a and 13' and projections 1b and 1b'. An eject spring 14 which is a tension spring is arranged to urge the ejector 13 upward. A lock lever 15 is arranged to lock the cartridge chamber lid 9 and is provided with a claw part 15b and a slot 15a. A lock spring 16 which is a tension spring is exerting an urging force on the lock lever 15 to urge the lock lever 15 to move counterclockwise on a projection 1c and at the same time to urge the lock lever 15 downward. The lock lever 15 is kept in a state as shown in FIG. 1 jointly by a stopper 1d and the abutting engagement of the projection 1c and the slot 15a.

An auxiliary lock lever 17 is arranged to lock the cartridge chamber lid 9 when the cartridge chamber lid 9 moves back to a correct position. An auxiliary lock spring 18 is hooked on spring pegs 17b and 1e and is thus arranged to urge the auxiliary lock lever 17 to move clockwise. However, the auxiliary lock lever 17 is stopped from making the clockwise motion by abutting on the lock lever 15. The auxiliary lock lever 17 is provided with an auxiliary lock claw 17a. Before the film cartridge 8 is set, the auxiliary lock claw 17a is kept in a retracted position so as not to abut on the cartridge chamber lid 9, as shown in FIG. 1. Reference numeral 23 denotes a cartridge chamber.

When the cartridge chamber lid 9 is moved clockwise from its position shown in FIG. 1 for loading the camera with the film cartridge 8, the support member 12 which is disposed on the cartridge chamber lid 9 comes to axially push the spool shaft disposed within the film cartridge 8 in such a way as to push the film cartridge 8 into the cartridge chamber 23 against the ejector 13 (against the urging force of the ejector spring 14).

Figure 2:
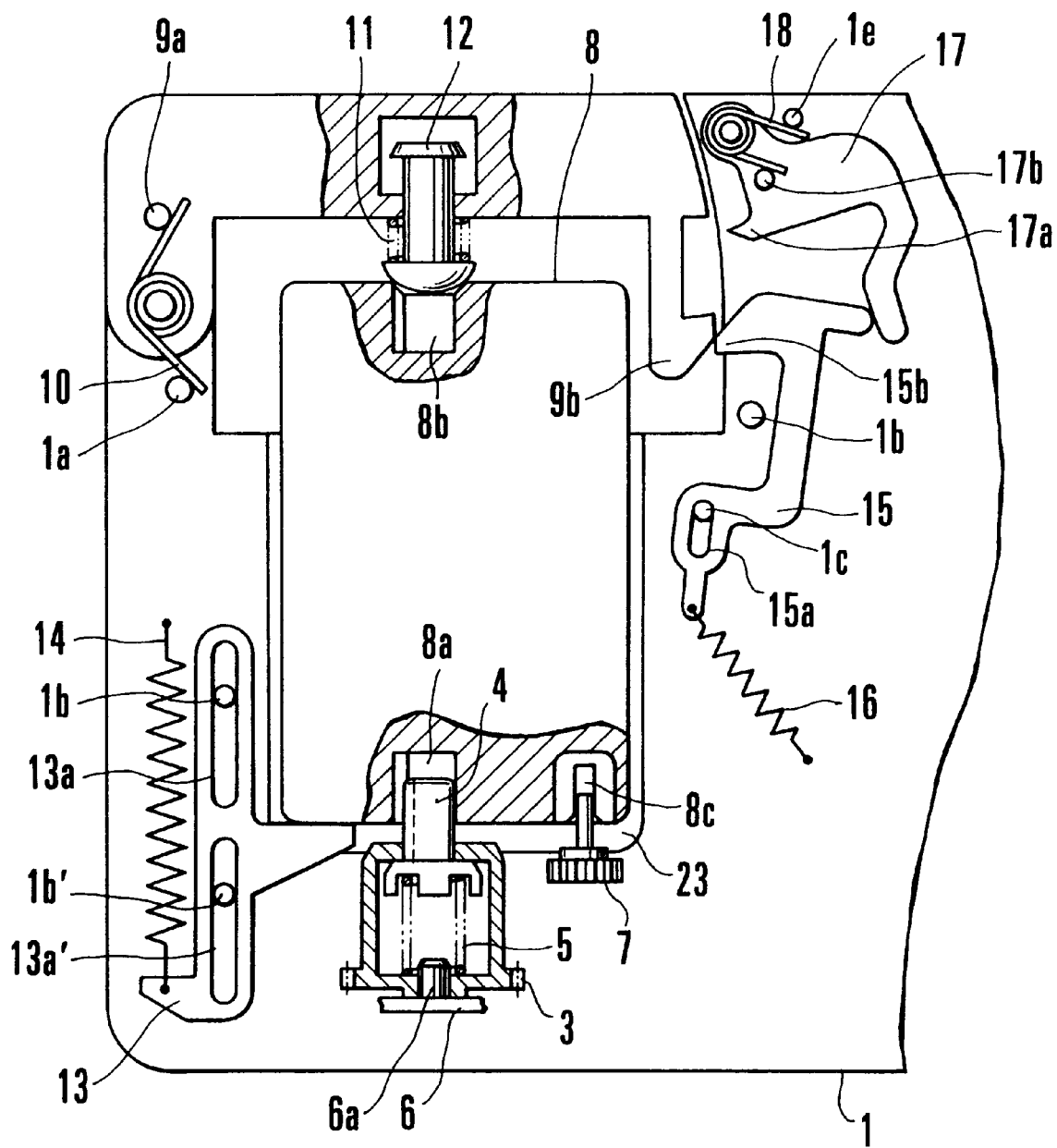
FIG. 2 is a partly cutaway rear view showing the camera of FIG. 1 in a state obtained when a cartridge chamber lid is swung to a correct position.

FIG. 2 shows the camera in a state obtained when the cartridge chamber lid 9 has swung to a correct position. In this instance, the lock claw 9b of the cartridge chamber lid 9 abuts on the lock lever 15 to cause the lock lever 15 to swing clockwise. However, the cartridge chamber lid 9 has not been locked as yet. Then, the auxiliary lock lever 17 is caused to swing counterclockwise by the clockwise swing of the lock lever 15.

Figure 3:
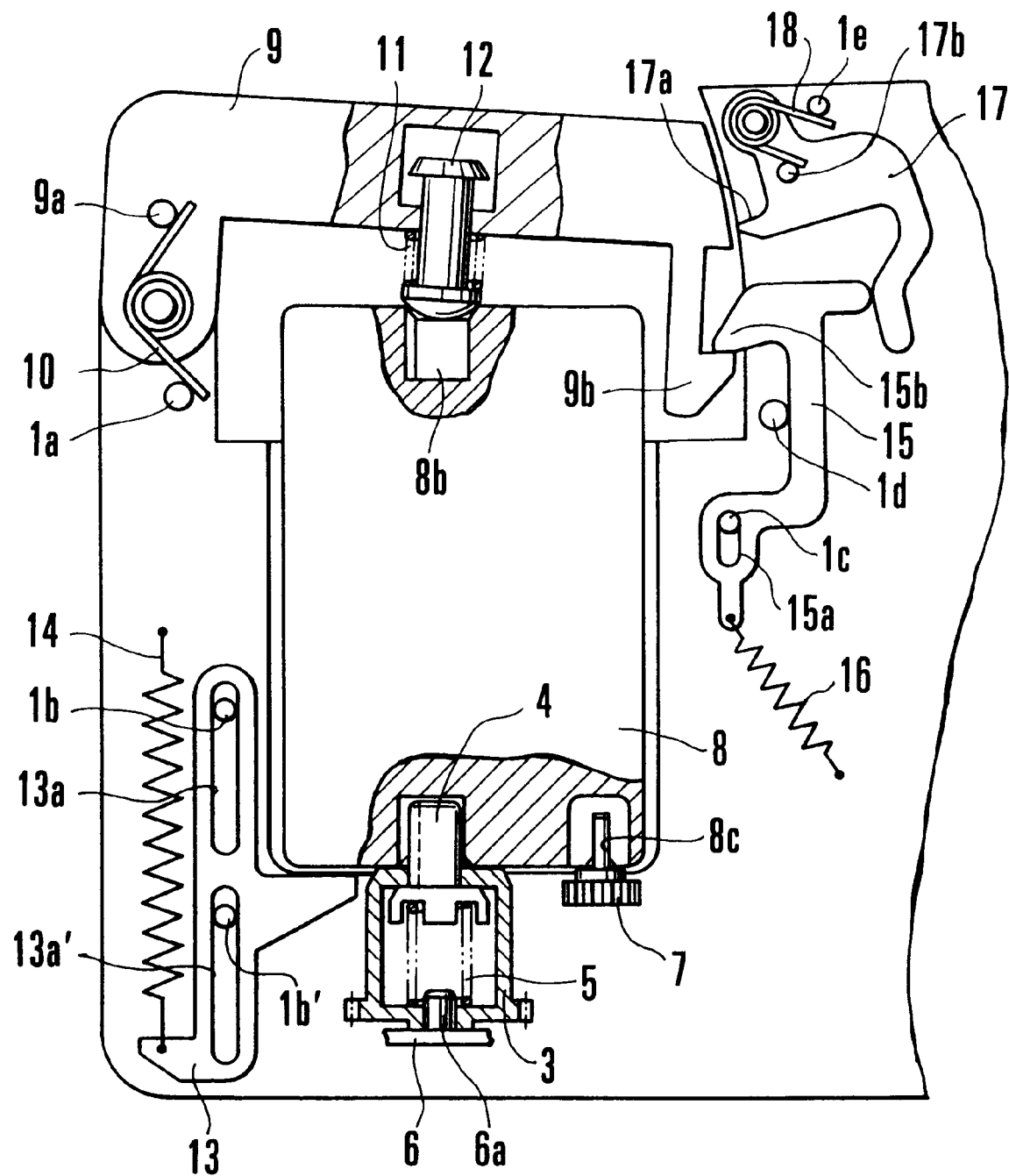
FIG. 3 is a partly cutaway rear view showing the same camera in a state obtained when the cartridge chamber lid is further pushed in from its position of FIG. 2 to be locked by a lock lever.

FIG. 3 shows the camera in a state obtained when the lock claw 9b of the cartridge chamber lid 9 is locked by the lock lever 15 with the cartridge chamber lid 9 further pushed in from the position shown in FIG. 2.

As shown in FIG. 3, the cartridge chamber lid 9 is arranged to be locked when it comes to a position which is located deeper inside of the camera body and then to cause the pushing-in spring 11 to have a greater amount of flexure. The pushing-in spring 11 is thus caused to exert a greater spring force by this arrangement to ensure that the film cartridge 8 is pushed into the correct position without fail. The light shield cover driving member 7 is thus enabled to engage without fail the light shield cover opening/closing engagement part 8c of the film cartridge 8.

When the user of the camera ceases to push the cartridge chamber lid 9 after the cartridge chamber lid 9 is locked as shown in FIG. 3, the lock lever 15 and the lock claw 9b of the cartridge chamber lid 9 begin to ascend in a state of still engaging each other, because the spring force of the opening spring 10 and the pushing-in spring 11 is larger than the spring force of the lock spring 16. In this instance, the auxiliary lock lever 17 swings clockwise as its abutting part is changed by the ascent of the lock lever 15.

Figure 4:
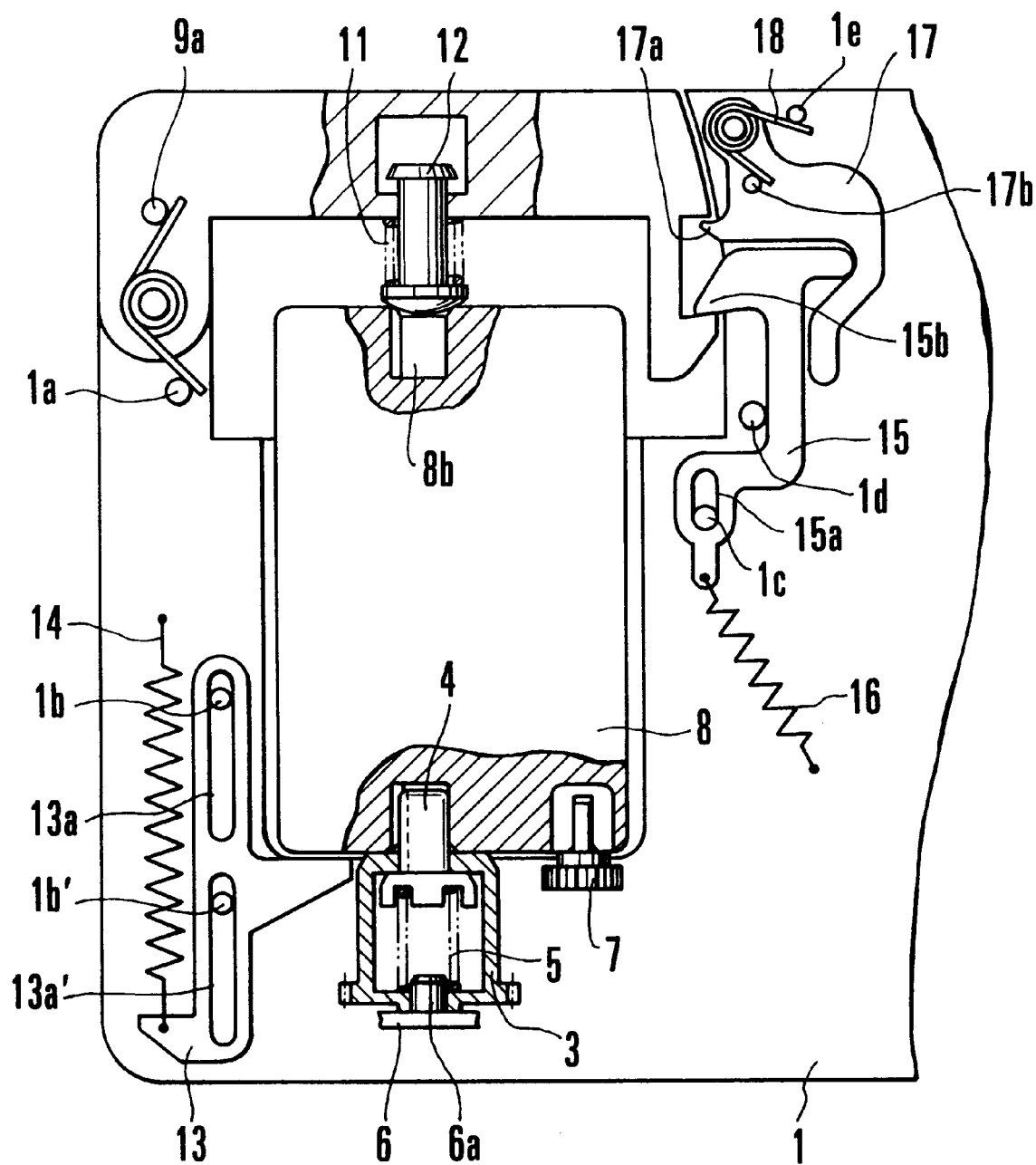
FIG. 4 is a partly cutaway rear view showing the same camera in a state obtained when the cartridge chamber lid is moved upward from its position shown in FIG. 3 back to the correct position.

FIGS. 4 shows the camera in a state obtained when the cartridge chamber lid 9 is brought back to the correct position by its ascent. In this state, the auxiliary lock claw 17a of the auxiliary lock lever 17 stays beneath the cartridge chamber lid 9 to prevent the cartridge chamber lid 9 from resuming its descent (by swinging clockwise). Further, in this state, the amount of flexure of the pushing-in spring 11 becomes less than the amount of flexure obtained in the state of FIG. 3 and, thus, the spring force of the spring 11 becomes weaker. It is sufficient to have this spring force arranged to be only a little larger than a force obtained by adding together the force of the eject spring 14 and the weight of the film cartridge 8. A frictional torque which takes place in transporting the film can be minimized with the spring force arranged in this manner.

As mentioned above, in loading the camera with the film cartridge 8, the cartridge chamber lid 9 is allowed to be locked only when it comes to a position deeper than its correct position. In the deeper position, the amount of flexure of the pushing-in spring 11 increases to give a larger spring force to ensure that the film cartridge 8 is accurately pushed in. Upon completion of loading, the cartridge chamber lid 9 comes back to its correct position to cause the spring force of the pushing-in spring 11 to become weaker. Therefore, in transporting the film, the load imposed by a frictional force on the base plate 6 can be lessened by this arrangement. The film transporting speed thus can be increased and the electric energy consumption can be decreased.

Further, the auxiliary lock lever 17 is arranged such that, after the cartridge chamber lid 9 comes back to its correct position, the auxiliary lock lever 17 prevents the cartridge chamber lid 9 from resuming its descent, so that rattling, etc., can be suppressed.

Figure 5:
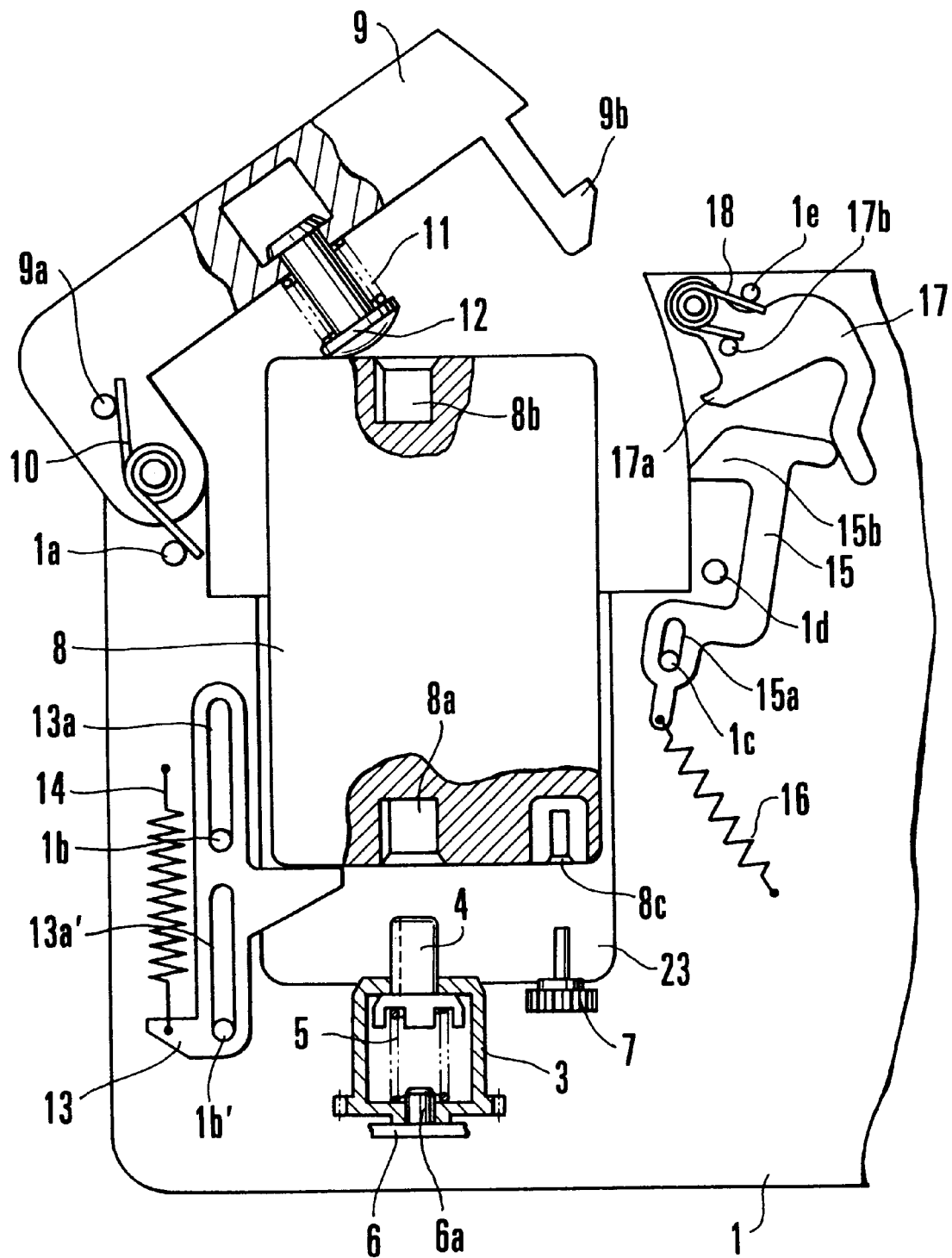
FIG. 5 is a partly cutaway rear view showing the same camera in a state obtained when the cartridge chamber lid is opened from its position shown in FIG. 4.

In taking out the film cartridge 8, when the lock lever 15 is caused to swing clockwise from its position shown in FIG. 4 by an external operation means (not shown), the auxiliary lock lever 17 swings counterclockwise to cause the claw part 15b of the lock lever 15 and the auxiliary lock claw 17a to move away from the locus of motion of the the lock claw 9b of the cartridge chamber lid 9, as shown in FIG. 5. The cartridge chamber lid 9 is caused to open by the opening spring 10. The urging force of the eject spring 14 then causes the ejector 13 to push out the film cartridge 8. After that, the urging force of the lock spring 16 causes the lock lever 15 to descend. The auxiliary lock lever 17 then swings clockwise to come back to the position of FIG. 1.

In the case of the first embodiment described above, the pushing-in spring 11 is arranged to change its spring force in transporting the film, after completion of loading, from the spring force obtained in pushing in (loading) the film cartridge 8 solely by changing the amount of flexure thereof. However, in a case where the camera has a limited space, the pushing-in 11 spring can not be arranged to change its spring force to a great extent.

In view of this, a second embodiment of this invention is arranged to use two pushing-in springs, i.e., first and second pushing-in springs 19 and 20. The first pushing-in spring 19 is arranged to be strong and the second pushing-in spring 20 to be weak, so that the film cartridge 8 can be reliably pushed in with a strong spring force and the film can be transported at a weak spring force to lessen the frictional torque.

Figure 6:
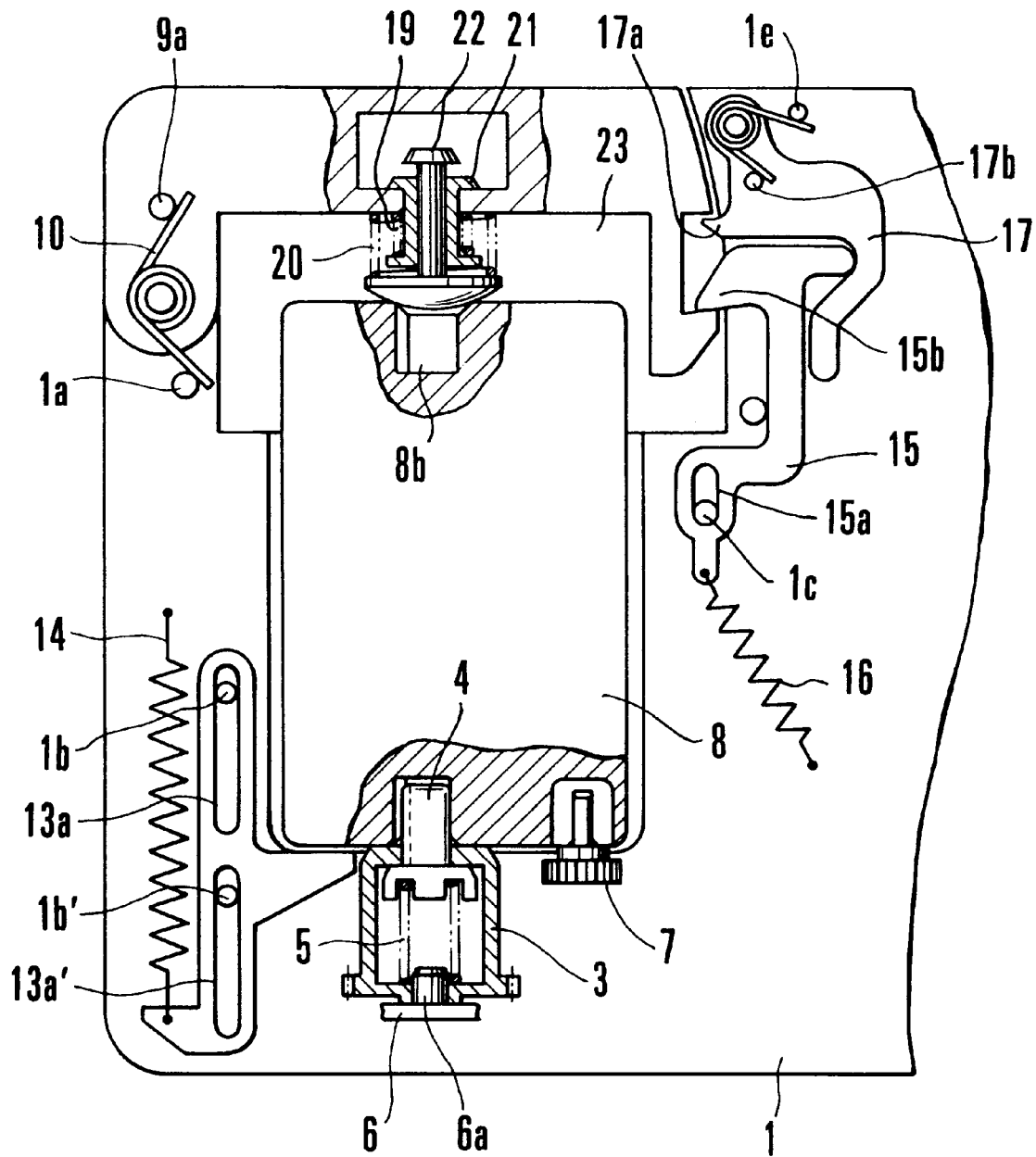
FIG. 6 is a partly cutaway rear view showing a camera arranged as a second embodiment of this invention in a state obtained upon completion of loading the camera with a film cartridge.
Figure 7:
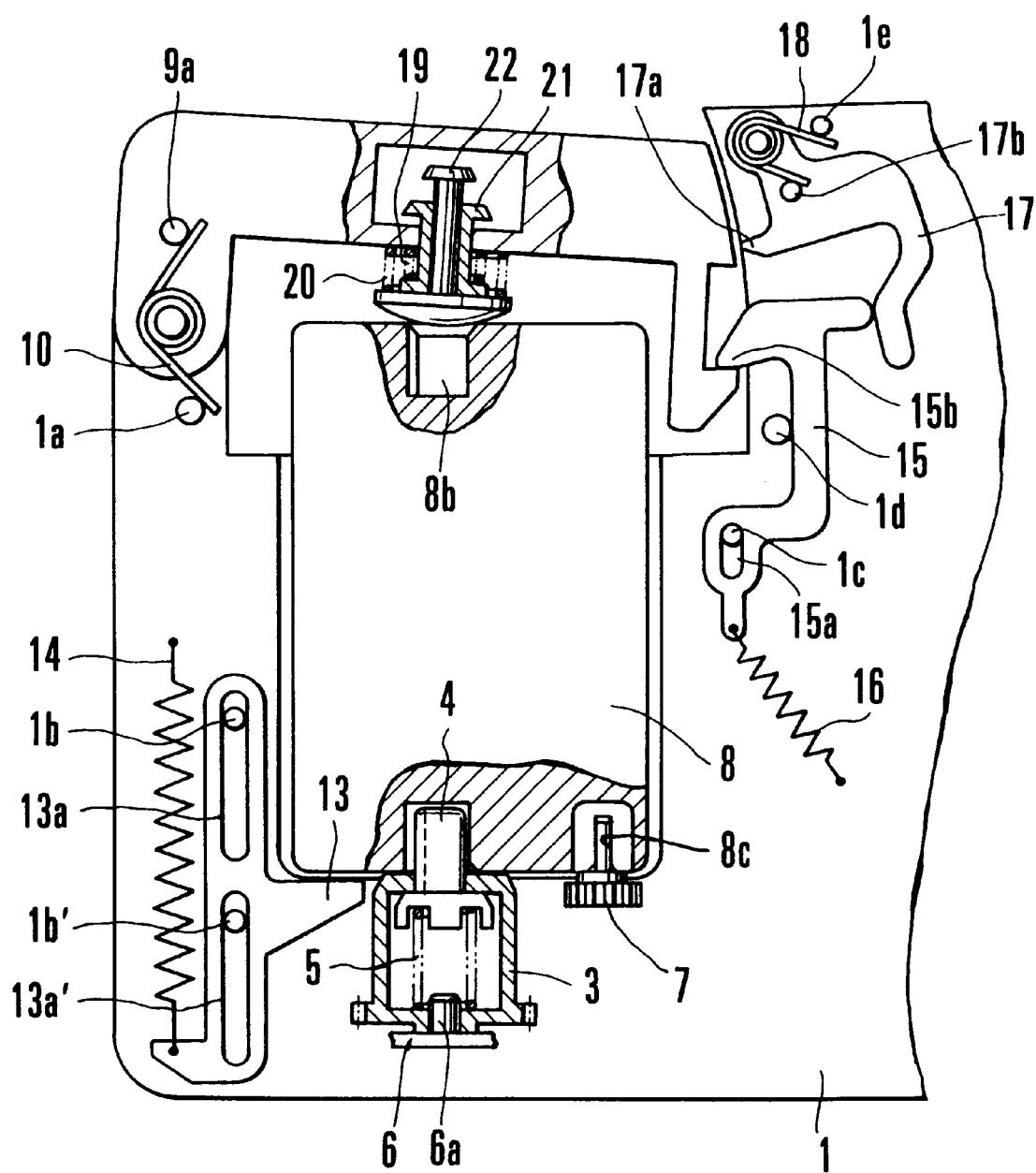
FIG. 7 is a partly cutaway rear view showing the camera of the second embodiment in a state obtained immediately before completion of loading the camera with the film cartridge.

FIGS. 6 and 7 show the arrangement of the second embodiment. FIG. 6 is a partly cutaway rear view showing the camera in a state obtained after completion of loading the film cartridge in a film cartridge chamber. The same component parts as those of the first embodiment are indicated by the same reference numerals and the details of them are omitted from the following description as the description of the first embodiment given in the foregoing applies to them.

Referring to FIG. 6, a first support member 21 is mounted on the cartridge chamber lid 9 and arranged to be slidable in the the direction of the thickness of the cartridge chamber lid 9. A first pushing-in spring 19 is arranged to urge the first support member 21 to move downward as viewed on the drawing. A second support member 22 is also mounted on the cartridge chamber lid 9 and arranged to be slidable in the direction of the thickness of the cartridge chamber lid 9 and is urged downward by a second pushing-in spring 20.

Upon completion of loading the camera with the film cartridge 8, the spring force of the first pushing-in spring 19 which is strong is no longer applied while only the spring force of the second pushing-in spring 20 is applied to the film cartridge 8. Since the spring force of the second pushing-in spring 20 is weak, the frictional torque taking place in transporting the film is small.

FIG. 7 is a partly cutaway rear view of the camera showing the camera in a state obtained while the film cartridge 8 is in process of being pushed in. In this state, the spring force of the first pushing-in spring 19 is applied to the film cartridge 8 in addition to that of the second pushing-in spring 20. Since the first pushing-in spring 19 is arranged to be fairly strong, the film cartridge 8 can be reliably pushed in to the correct position to enable the light shield cover driving member 7 to duly engage the opening/closing engagement member 8c of the light shield cover of the film cartridge 8.

Other actions of the second embodiment are omitted from description as they are the same as those of the first embodiment.

Figure 8:
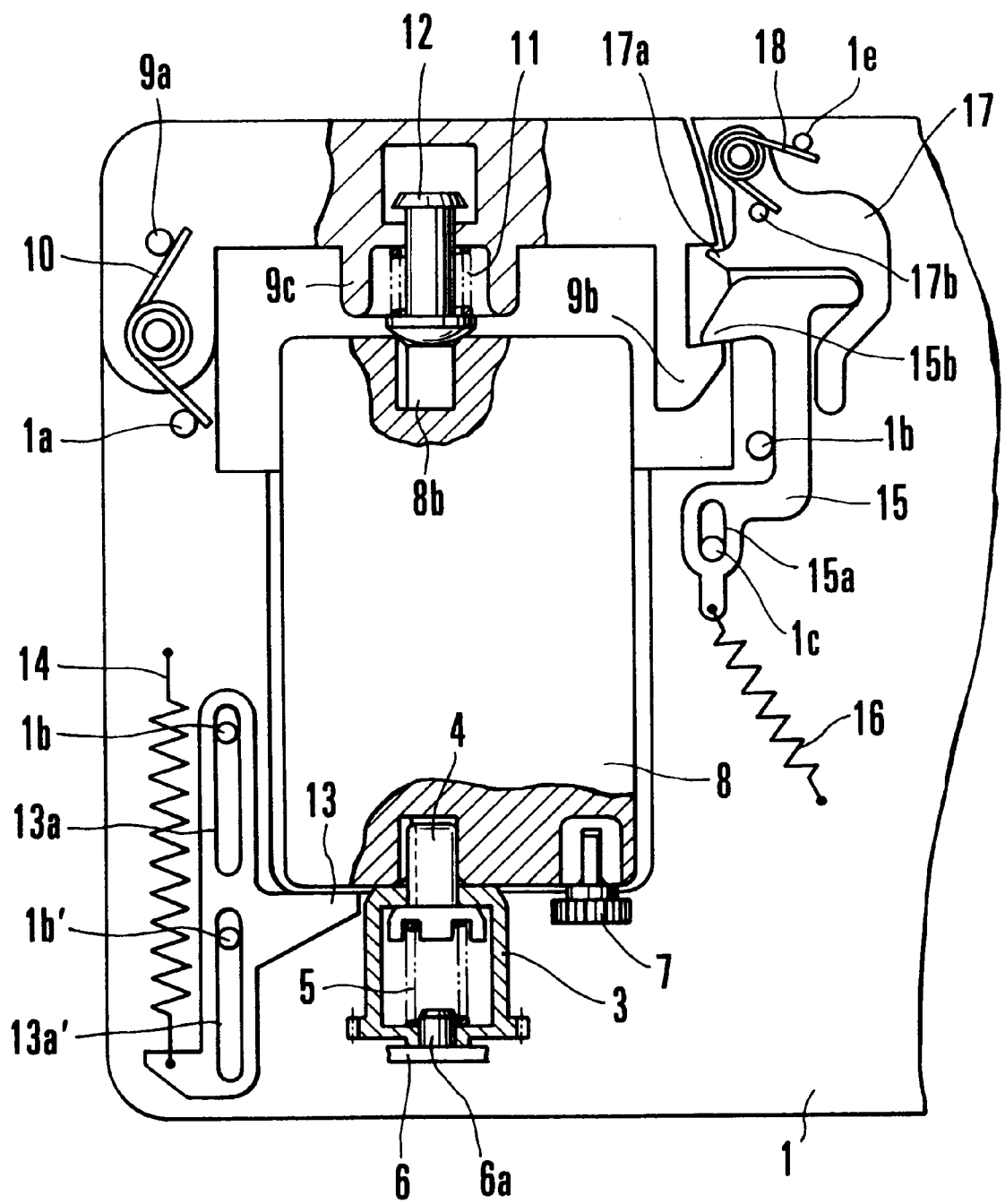
FIG. 8 is a partly cutaway rear view showing a camera arranged as a third embodiment of this invention in a state obtained upon completion of loading the camera with a film cartridge.
Figure 9:
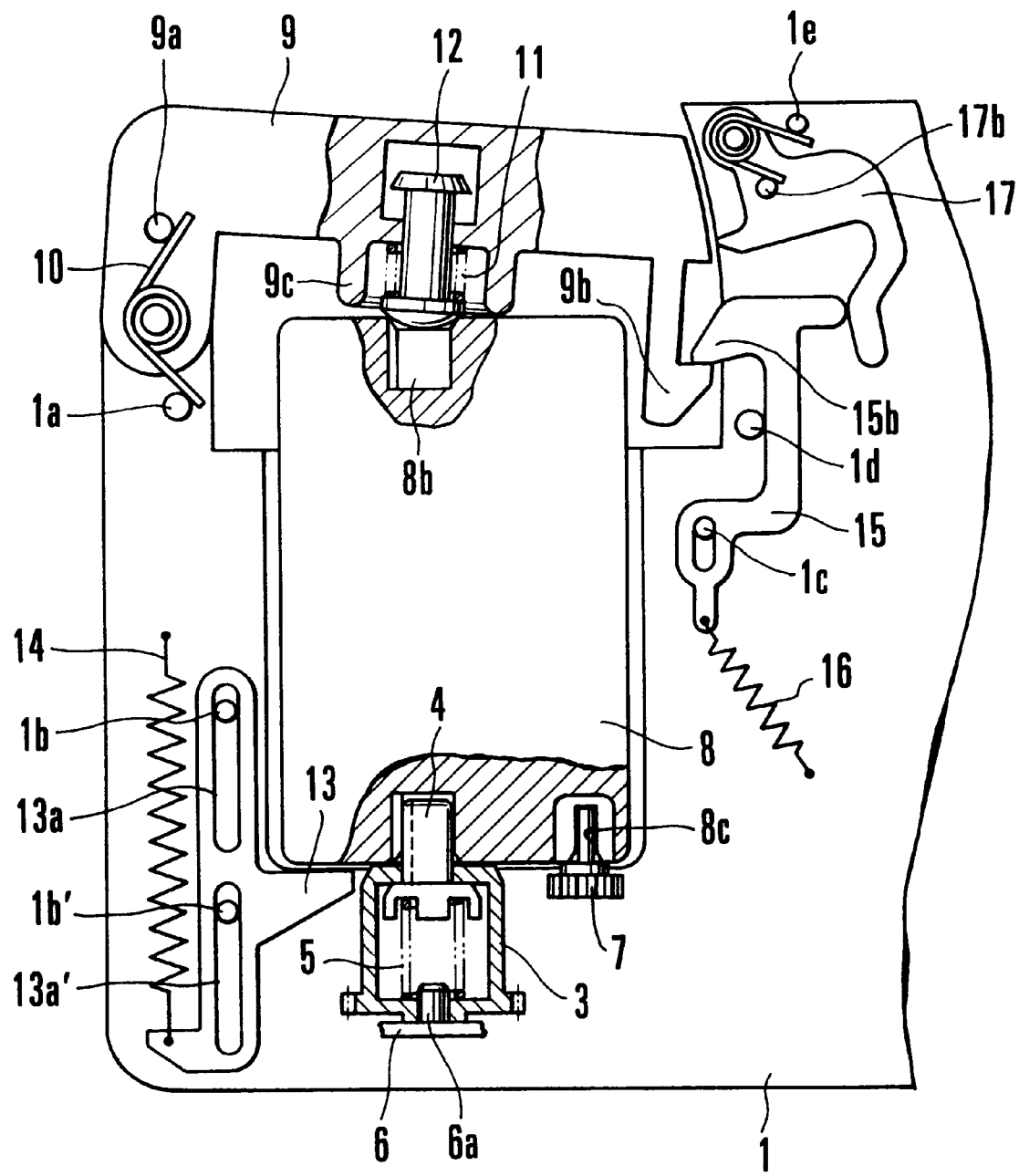
FIG. 9 is a partly cutaway rear view showing the camera of the third embodiment in a state obtained immediately before completion of lading the camera with the film cartridge.

FIGS. 8 and 9 relate to a third embodiment of this invention. The third embodiment is arranged to have the film cartridge more reliably pushed in. For the third embodiment, the same component parts as those of the first embodiment are indicated by the same reference numerals and the details of them are omitted from the following description as the description of the first embodiment given in the foregoing applies to them.

FIG. 8 is a partly cutaway rear view showing the camera in a state obtained upon completion of loading the camera with the film cartridge 8. The third embodiment differs from the first embodiment only in that the cartridge chamber lid 9 is provided with a projection 9c. When the camera is in the loading-completed state as shown in FIG. 8, the projection 9c is not abutting on the film cartridge 8. Further, in this case, the pushing-in spring 11 is arranged to have a weak spring force, which, therefore, causes a small frictional torque.

In pushing in the film cartridge 8 (in loading) as shown in FIG. 9, however, the projection 9c comes to abut on the film cartridge 8 to push the film cartridge 8, so that the film cartridge 8 can be reliably pushed in. Therefore, the light shield cover driving member 7 is allowed to engage without fail the light shield cover opening/closing engagement part 8c of the film cartridge 8. Other actions of the third embodiment are the same as those of the first embodiment and are, therefore, omitted from description.

FIGS. 10 to 13 relate to a fourth embodiment of this invention. In the case of the fourth embodiment, the spring pressure of the pushing-in spring is weakened when the film cartridge 8 has been set in its correct position.

Figure 10:
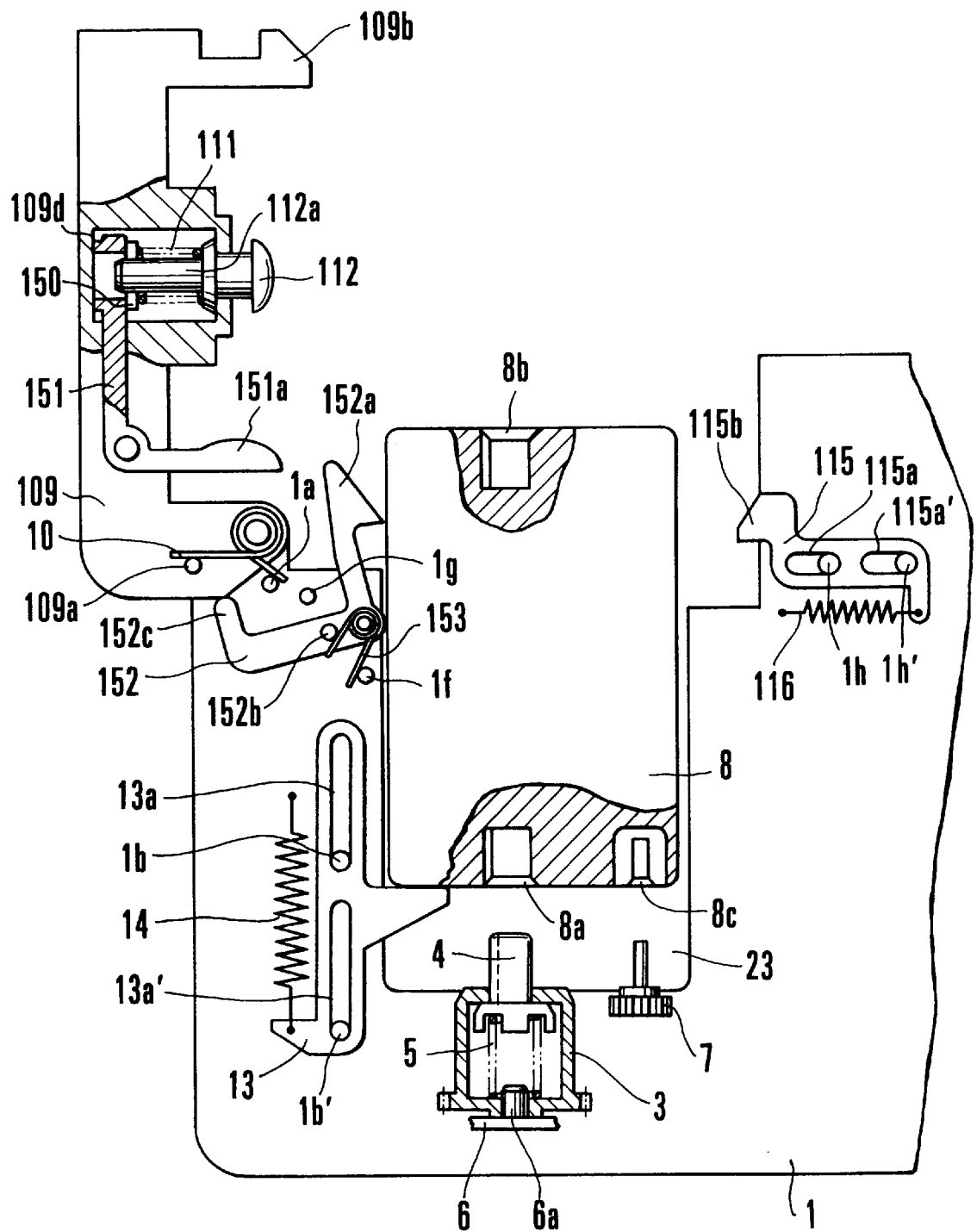
FIG. 10 is a partly cutaway rear view showing a camera arranged as a fourth embodiment of this invention in a state obtained before completion of setting a film cartridge in a cartridge chamber.

FIG. 10 is a partly cutaway rear view showing a camera in a state obtained before completion of setting the film cartridge 8. All the parts of the fourth embodiment that are arranged in the same manner as those of the first embodiment are indicated by the same reference numerals, and the details of them are omitted from the following description as the description of the first embodiment given in the foregoing applies to them.

Referring to FIG. 10, the camera has a cartridge chamber lid 109. The opening spring 10 is hooked on spring pegs 109a and 1a and is arranged to constantly urge the cartridge chamber lid 109 in the direction of opening the cartridge chamber lid 109. The cartridge chamber lid 109 has a claw part 109b and carries a support member 112 which is slidable in the direction of the thickness of the cartridge chamber lid 109.

The support member 112 has a spring guide shaft part 112a. A slidable spring washer 150 is fitted on the spring guide shaft part 112a. A spring pressure control lever 151 which is swingable is pivotally supported by the cartridge chamber lid 109. The spring pressure control lever 151 has an abutting part 151a at its one end while the other end is loosely fitted on the spring guide shaft part 112a. A pushing-in spring 111 is provided on the spring guide shaft part 112a. The pushing-in spring 111 is arranged to urge the support member 112 to move to the right as viewed on FIG. 10 and to urge via the spring washer 150 the spring pressure control lever 151 to swing counterclockwise. The spring pressure control lever 151 is prevented from swinging by abutting on the inner wall 109d of the cartridge chamber lid 109.

A cartridge lock lever 152 is arranged to lock the film cartridge 8 with its claw part 152a when the camera is completely loaded with the film cartridge 8. A cartridge lock spring 153 which is hooked on spring pegs 152b and 1f is arranged to urge the cartridge lock lever 152 to swing clockwise. Reference numeral 1g denotes a stopper. In a state obtained before completion of setting the film cartridge 8, as shown in FIG. 10, the cartridge lock lever 152 has its one end 152c abut on the cartridge chamber lid 109 and has been swung counterclockwise by a balance between the spring force of the opening spring 10 and that of the cartridge lock spring 153. Then, the claw part 152a has not been protruding in the direction of loading the film cartridge 8.

A lock lever 115 is provided for locking the cartridge chamber lid 109 and is slidable by guide slots 115a and 115a' and projections 1h and 1h'. A lock spring 116 which is a tensile spring is arranged to urge the lock lever 115 to move to the left. With the camera arranged in this manner, the cartridge chamber lid 109 is caused to swing clockwise in loading the film cartridge 8.

Figure 11:
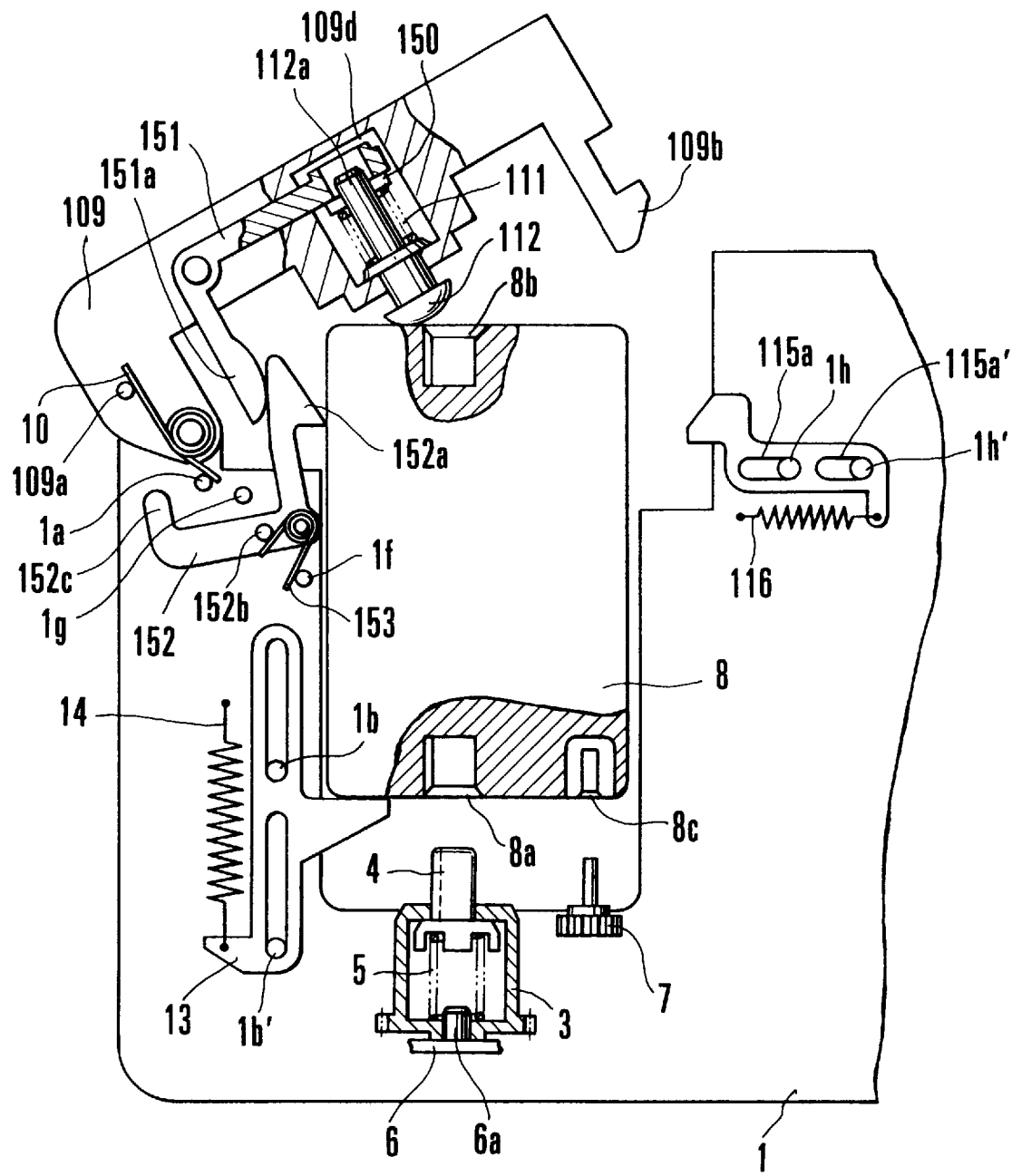
FIG. 11 is a partly cutaway rear view showing the camera in a state obtained when a cartridge chamber lid is pushed in from its position shown in FIG. 10.

FIG. 11 shows the camera in a state obtained when the support member 112 has come to abut on the film cartridge 8. In this state, the claw part 152a of the cartridge lock lever 152 abuts on the film cartridge 8 to prevent the cartridge lock lever 152 from swinging clockwise. The abutting part 151a of the spring pressure control lever 151 is then located on the left side of the claw part 152a of the cartridge lock lever 152.

Figure 12:
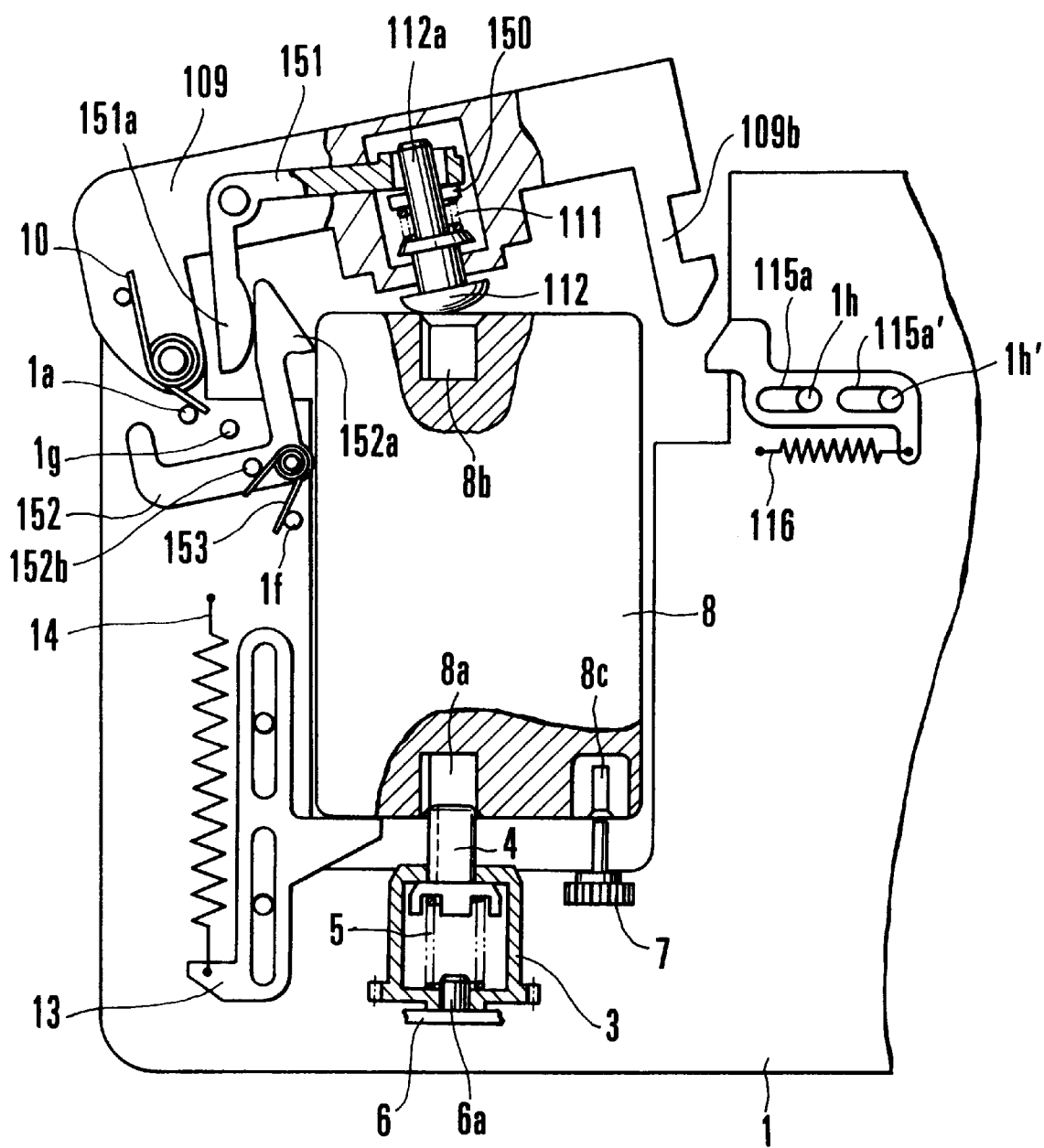
FIG. 12 is a partly cutaway rear view showing the camera in a state obtained when the cartridge chamber lid is pushed in further from its position shown in FIG. 11.

FIG. 12 shows the camera in a state obtained when the cartridge chamber lid 109 is swung further clockwise from its position shown in FIG. 11. In this state, the abutting part 151a of the spring pressure control lever 151 comes into contact with the cartridge lock lever 152 to cause the spring pressure control lever 151 to swing clockwise. One end of the spring pressure control lever 151 then causes the pushing-in spring 111 to flex through the spring washer 150. The spring force of the pushing-in spring 111 is increased by this, and the film cartridge pushing force of the support member 112 also increases accordingly.

Figure 13:
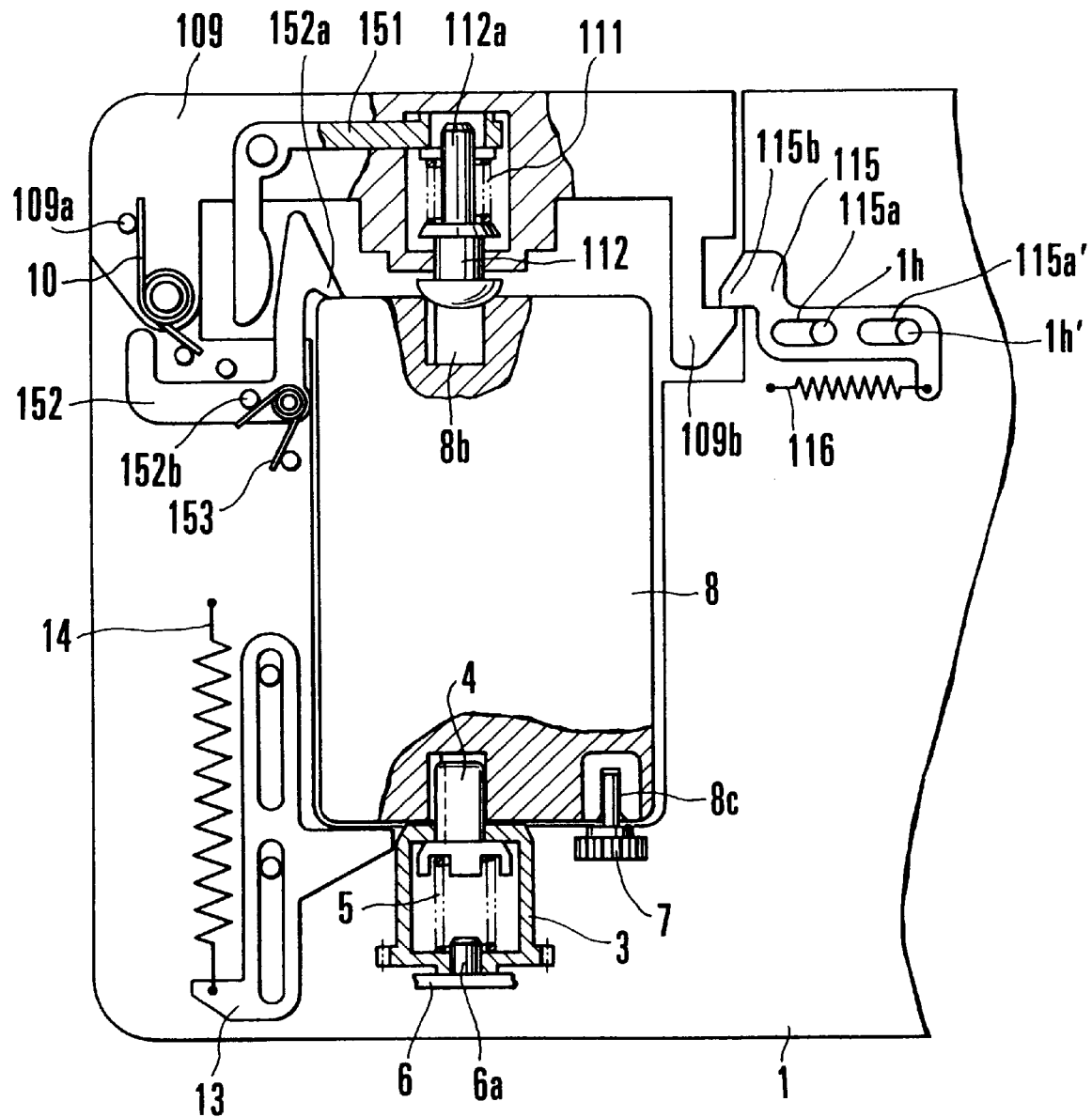
FIG. 13 is a partly cutaway rear view showing the camera in a state obtained when the film cartridge is set in a correct position from its position of FIG. 12.
Figure 14:
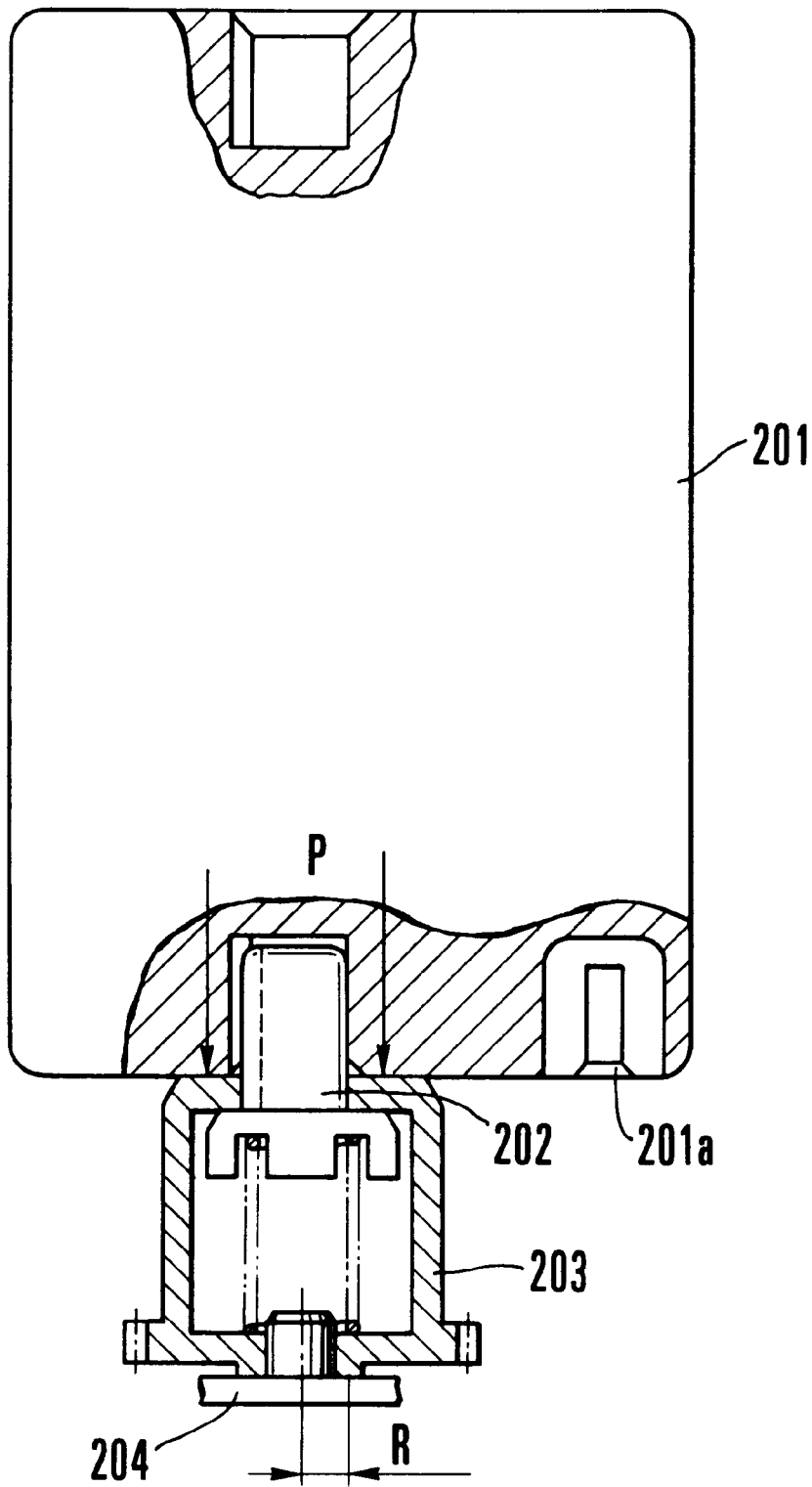
FIG. 14 shows a problem presented by the film cartridge loading device of the conventional camera.

With the cartridge chamber lid 109 further pushed in, when the film cartridge 8 is set in its correct position as shown in FIG. 13, the claw part 109b of the cartridge chamber lid 109 is locked by the lock lever 115 to keep the cartridge chamber lid 109 closed. The cartridge lock lever 152 is then caused to swing clockwise by the cartridge lock spring 153. The claw part 152a of the cartridge lock lever 152 then comes to lock the film cartridge 8. At the same time, the pushing-in spring 111 causes the spring pressure control lever 151 to swing counterclockwise. As a result, the amount of flexure of the pushing-in spring 111 decreases to make its spring pressure weaker. The frictional torque which takes place in transporting the film, therefore, becomes smaller.

In the case of the fourth embodiment, there is obtained a strong spring pressure until the film cartridge 8 is set in its correct position. The film cartridge 8 thus can be pushed in more reliably than in the case of the first embodiment. The light shield cover driving member 7, therefore, can be more reliably caused to engage the light shield cover opening/closing engagement part 8c of the film cartridge 8.

The film cartridge 8 is taken out as follows. When the lock lever 115 is moved to the right by an operation means (not shown) provided on the outside of the camera, the cartridge chamber lid 109 is unlocked and swings counterclockwise. Before the cartridge chamber lid 109 fully opens, the cartridge chamber lid 109 comes to abut on the cartridge lock lever 152 to cause the cartridge lock lever 152 to swing counterclockwise. The film cartridge 8 is unlocked by this. The urging force of the eject spring 14 then moves the film cartridge 8 outward and the camera comes back to the state of FIG. 10.

The fourth embodiment of course may be arranged to have a double spring arrangement like in the case of the second embodiment or to have a rigid pushing-in arrangement like in the case of the third embodiment.

Each of the first to fourth embodiments of this invention described in the foregoing is arranged to make the spring pressure of pushing the film cartridge stronger in loading the film cartridge 8 and to weaken the spring pressure after completion of loading. Therefore, the film cartridge 8 can be reliably set in the loading position and the light shield cover driving member 7 can be caused to reliably engage the light shield cover opening/closing engagement part 8c of the film cartridge 8. Besides, after completion of film cartridge loading, the film can be transported at a high speed and consumption of electric energy can be lessened by lowering the frictional torque.

Since the spring pressure is variable by varying the amount of pushing in the film cartridge, as in the case of each of the first to third embodiments, the camera can be arranged to have the above-stated advantages despite the simpleness of arrangement.

Further, since each of the first to third embodiments is arranged to have the cartridge chamber lid 9 to be prevented from moving downward again by the auxiliary lock lever 17, the cartridge chamber lid 9 never rattles after film cartridge loading.

In the case of the fourth embodiment, the force generated by the spring 111 never becomes smaller until the film cartridge 8 is set in its correct loading position. The film cartridge 8, therefore, can be more accurately set in the correct loading position.

In the case of the first embodiment, the pushing force is arranged to be variable solely by changing the amount of flexure of one spring 11. Therefore, the structural arrangement of the camera can be simplified.

The second embodiment is arranged to use two springs 19 and 20. The arrangement permits the camera to have a large difference between the spring pressure to be used in film cartridge loading and the spring pressure to be used after completion of the film cartridge loading.

The third embodiment is arranged to have the projection 9c formed integrally with the cartridge chamber lid 9 and to push in the film cartridge 8 directly by the projection 9c. This ensures that the film cartridge 8 can be reliably set in its loading position.

As regards the film cartridge loading direction, this invention applies not only to a case where the film cartridge is to be loaded from the upper surface side of the camera but also to a case where the film cartridge is to be inserted, for example, from below the bottom side or from one side of the camera. In the case of loading from one side, the support member and the pushing-in spring to be used for setting the film cartridge in a correct position are not disposed on the cartridge chamber lid but are arranged on one side face of the cartridge chamber located opposite to another side face on which the fork is disposed. In that case, the support member is preferably arranged to be retractable (in the direction of axis of the film cartridge) to facilitate loading.

This invention is not limited to the cases where the film cartridge is to be axially loaded or ejected as in the case of the embodiments described.

This invention is of course applicable to a case where the film feeding fork which engages the spool shaft of the film cartridge and the movable light shield cover driving member which engages the operating member of the movable light shield cover of the film cartridge are arranged to be movable with respect to the film cartridge. In that instance, the film feeding fork and the movable light shield cover driving member are arranged in the same manner as the embodiments described to abut on the film cartridge at first with a strong force and, after that, to weaken the force.

This invention is applicable to a case where an image recording medium to be used is not a film.

This invention applies also to a film cartridge of a type different from the type used by the embodiments described, a cartridge containing an image recording medium other than a film, a cartridge of some other kind and a device for loading or ejecting something other than a cartridge, such as a battery or the like.

Further, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the individual components shown in schematic or block form in the drawings are all well-known in the camera arts and their specific construction and operation are not critical to the operation or best mode for carrying out the invention.

This invention may be carried out by suitably combining the embodiments or their technological elements described in the foregoing.

This invention applies to cases where either the whole or a part of claims or the arrangement of the embodiments described forms one apparatus or is used in combination with other apparatus or as a component element of an apparatus.

This invention is applicable to cameras of varied kinds, such as a single-lens reflex camera, a lens-shutter type camera, a video camera, etc, optical apparatuses other than cameras, other apparatuses, devices adapted for cameras, optical apparatuses and other apparatuses, and component elements of these apparatuses and devices.

What is claimed is:

1. An apparatus adapted for an image recording medium cartridge having an operation part for operating a cover to open and close an opening part for passing an image recording medium, comprising:
   a) an engaging device which causes the operation part of the cartridge to act; and
   b) a force applying device which applies a first force to the cartridge in the direction to charge the cartridge so as to cause said engaging device to engage the operation part and for subsequently applying a second force smaller than the first force to the cartridge in the direction to charge the cartridge so as to hold the cartridge.

2. An apparatus according to claim 1, wherein said image recording medium includes a film.

3. An apparatus according to claim 1, wherein the cover of the cartridge includes light shield means.

4. An apparatus adapted for an image recording medium cartridge having an operation part for operating a cover to open and close an opening part for passing an image recording medium, comprising:
   a) an engaging device which causes the operation part of the cartridge to act; and
   b) a force applying device which applies a first force to the cartridge so as to cause said engaging device to engage the operation part and for subsequently applying a second force smaller than the first force to the cartridge so as to hold the cartridge, said force applying device including a pushing member which pushes spool shaft of the cartridge.

5. An apparatus according to claim 1, wherein said force applying device includes an elastic member which generates at least one of the first and second forces.

6. An apparatus adapted for an image recording medium cartridge having an operation part for operating a cover to open and close an opening part for passing an image recording medium, comprising:
   a) an engaging device which causes the operation part of the cartridge to act;
   b) a force applying device which applies a first force to the cartridge so as to cause said engaging device to engage the operation part and for subsequently applying a second force smaller than the first force to the cartridge so as to hold the cartridge; and
   c) a lid of a chamber for loading the cartridge, wherein said force applying device is disposed at said lid.

7. An apparatus adapted for an image recording medium cartridge having an operation part for operating a cover to open and close an opening part for passing an image recording medium, comprising:
   a) an engaging device which causes the operation part of the cartridge to act;
   b) a force applying device which applies a first force to the cartridge so as to cause said engaging device to engage the operation part and for subsequently applying a second force smaller than the first force to the cartridge so as to hold the cartridge; and
   c) a lid of a chamber for loading the cartridge, wherein said force applying device is arranged to apply said first force to the cartridge during a closing operation of said lid.

8. An apparatus adapted for an image recording medium cartridge having an operation part for operating a cover to open and close an opening part for passing an image recording medium, comprising:
   a) an engaging device which causes the operation part of the cartridge to act;
   b) a force applying device which applies a first force to the cartridge so as to cause said engaging device to engage the operation part and for subsequently applying a second force smaller than the first force to the cartridge so as to hold the cartridge; and
   c) a fork for applying a driving force to the cartridge so as to transport the image recording medium, wherein said force applying device is disposed in a position opposite to the position of said fork across the cartridge loaded into the apparatus when said force applying device applies said first force to the cartridge.

9. An apparatus according to claim 1, wherein said force applying device includes means for applying the first force to the cartridge in loading the apparatus with the cartridge and for applying the second force to the cartridge after completion of loading the apparatus with the cartridge.

10. An apparatus according to claim 1, wherein said engaging device includes means for moving so as to switch an application of the first force and an application of the second force to the cartridge.

11. An apparatus according to claim 1, further comprising a preventing device for preventing the first force from being applied to the cartridge again after the first force is applied to the cartridge.

12. An apparatus adapted for an image recording medium cartridge having an operation part for operating a cover to open and close an opening part for passing an image recording medium, comprising:
   a) an engaging device which causes the operation part of the cartridge to act;

b) a force applying device which applies a first force to the cartridge so as to cause said engaging device to engage the operation part and for subsequently applying a second force smaller than the first force to the cartridge so as to hold the cartridge; and c) a camera.

13. An apparatus adapted to use an image recording medium cartridge having an operation part for operating a cover to open and close an opening part for passing an image recording medium, comprising:

a) an engaging device which causes the operation part of the cartridge to act; and b) a force applying device which applies a first force to the cartridge in the direction to charge the cartridge so as to cause said engaging device to engage the operation part and for subsequently applying a second force smaller than the first force to the cartridge in the direction to charge the cartridge so as to hold the cartridge.

14. A unit adapted for one of a camera and an apparatus adapted to use an image recording medium cartridge having an operation part for operating a cover to open and close an opening part for passing an image recording medium, comprising:

a) an engaging device which causes the operation part of the cartridge to act; and b) a force applying device which applies a first force to the cartridge in the direction to charge the cartridge so as to cause said engaging device to engage the operation part and for subsequently applying a second force smaller than the first force to the cartridge in the direction to charge the cartridge so as to hold the cartridge.

15. An apparatus adapted for an image recording medium cartridge having an operation part for operating a light shield portion, comprising:

a) an engaging device which causes the operation part of the cartridge to act; and b) a force applying device which applies a first force to the cartridge in the direction to charge the cartridge so as to cause said engaging device to engage the operation part and for subsequently applying a second force smaller than the first force to the cartridge in the direction to charge the cartridge so as to hold the cartridge.

16. An apparatus according to claim 15, wherein said image recording medium includes a film.

17. An apparatus according to claim 15, wherein said light shield portion is arranged to shield the cartridge from light.

18. An apparatus adapted for an image recording medium cartridge having an operation part for operating a light shield portion, comprising:

a) an engaging device which causes the operation part of the cartridge to act; and b) a force applying device which applies a first force to the cartridge so as to cause said engaging device to engage the operation part and for subsequently applying a second force smaller than the first force to the cartridge so as to hold the cartridge; said force applying device including a pushing member which pushes a spool shaft of the cartridge.

19. An apparatus according to claim 15, wherein said force applying device includes an elastic member which generates at least one of the first and second forces.

20. An apparatus adapted for an image recording medium cartridge having an operation part for operating a light shield portion, comprising:

a) an engaging device which causes the operation part of the cartridge to act;

b) a force applying device which applies a first force to the cartridge so as to cause said engaging device to engage the operation part and for subsequently applying a second force smaller than the first force to the cartridge so as to hold the cartridge; and c) a lid of a chamber for loading the cartridge, wherein said force applying device is disposed at said lid.

21. An apparatus adapted for an image recording medium cartridge having an operation part for operating a light shield portion, comprising:

a) an engaging device which causes the operation part of the cartridge to act;

b) a force applying device which applies a first force to the cartridge so as to cause said engaging device to engage the operation part and for subsequently applying a second force smaller than the first force to the cartridge so as to hold the cartridge; and c) a lid of a chamber for loading the cartridge, wherein said force applying device is arranged to apply said first force to the cartridge during a closing operation of said lid.

22. An apparatus adapted for an image recording medium cartridge having an operation part for operating a light shield portion, comprising:

a) an engaging device which causes the operation part of the cartridge to act;

b) a force applying device which applies a first force to the cartridge so as to cause said engaging device to engage the operation part and for subsequently applying a second force smaller than the first force to the cartridge so as to hold the cartridge, and c) a fork for applying a driving force to the cartridge so as to transport the image recording medium, wherein said force applying device is disposed in a position opposite to the position of said fork across the cartridge loaded into the apparatus when said force applying device applies said first force to the cartridge.

23. An apparatus according to claim 15, wherein said force applying device includes means for applying the first force to the cartridge in loading the apparatus with the cartridge and for applying the second force to the cartridge after completion of loading the apparatus with the cartridge.

24. An apparatus according to claim 15, wherein said engaging device includes means for moving so as to switch an application of the first force and an application of the second force.

25. An apparatus according to claim 15, further comprising a preventing device for preventing the first force from being applied to the cartridge again after the first force is applied to the cartridge.

26. An apparatus adapted for an image recording medium cartridge having an operation part for operating a light shield portion, comprising:

a) an engaging device which causes the operation part of the cartridge to act;

b) a force applying device which applies a first force to the cartridge so as to cause said engaging device to engage the operation part and for subsequently applying a second force smaller than the first force to the cartridge so as to hold the cartridge; and c) a camera.

27. An apparatus adapted to use an image recording medium cartridge having an operation part for operating a light shield portion, comprising:

a) an engaging device which causes the operation part of the cartridge to act; and b) a force applying device which applies a first force to the cartridge in the direction to charge the cartridge so as to cause said engaging device to engage the operation part and for subsequently applying a second force smaller than the first force to the cartridge in the direction to charge the cartridge so as to hold the cartridge.

28. A unit adapted for one of a camera and an apparatus adapted to use an image recording medium cartridge having an operation part for operating a light shield portion, comprising:

a) an engaging device which causes the operation part of the cartridge to act; and b) a force applying device which applies a first force to the cartridge in the direction to charge the cartridge so as to cause said engaging device to engage the operation part and for subsequently applying a second force smaller than the first force to the cartridge in the direction to charge the cartridge so as to hold the cartridge.

29. An apparatus adapted for receiving an image recording medium cartridge comprising:

a biasing structure for applying a biasing force to the cartridge in the course of cartridge insertion into the apparatus and retention of the cartridge in the apparatus, said biasing force being diminished after completion of the cartridge insertion; and a cartridge-receiving chamber and a cover for closing and opening said cartridge-receiving chamber, at least a portion of said biasing structure being disposed with said cover.

30. An apparatus according to claim 29, wherein said apparatus defines a latch for retention of said cover in a first position of said cover, said apparatus being configured to permit insertion of said cover to a second position therein which is located further inside of said apparatus than said first position.

* * * * *